United States Patent [19]

Verma et al.

[11] Patent Number: 6,004,476
[45] Date of Patent: *Dec. 21, 1999

[54] CORROSION INHIBITING SOLUTIONS AND PROCESSES FOR REFRIGERATION SYSTEMS COMPRISING HETEROPOLY COMPLEX ANIONS OF TRANSITION METAL ELEMENTS ADDITIONAL ADDITIVES

[75] Inventors: Shyam Kumar Verma, Gastonia, N.C.; Manuel Sarkis Mekhjian, Fremont, Calif.; George Robert Sandor, Gastonia, N.C.; Philip John Boon, Lower Heswall, United Kingdom

[73] Assignee: FMC Corporation, Philadelphia, Pa.

[*] Notice: This patent is subject to a terminal disclaimer.

[21] Appl. No.: 08/944,737

[22] Filed: Oct. 6, 1997

Related U.S. Application Data

[60] Provisional application No. 60/053,099, Jul. 26, 1997.
[51] Int. Cl.⁶ .............................. C09K 5/04; F25B 15/00
[52] U.S. Cl. .............................. 252/69; 252/67; 252/68; 62/112
[58] Field of Search ................ 252/69, 67, 68; 62/112

[56] References Cited

U.S. PATENT DOCUMENTS

| | | | |
|---|---|---|---|
| 2,725,364 | 11/1955 | Dazzi | 524/83 |
| 3,227,518 | 1/1966 | Kennedy | 423/306 |
| 3,424,601 | 1/1969 | Hamilton | 106/170.16 |
| 3,478,530 | 11/1969 | Aronson | 62/112 |
| 4,077,929 | 3/1978 | Robinson | 524/144 |
| 4,311,024 | 1/1982 | Itoh et al. | 62/474 |
| 4,563,253 | 1/1986 | Leidheiser, Jr. et al. | 205/171 |
| 4,612,378 | 9/1986 | Bosshard et al. | 548/170 |
| 4,963,290 | 10/1990 | Bressan et al. | 252/387 |
| 5,152,929 | 10/1992 | Bentley et al. | 252/391 |
| 5,206,404 | 4/1993 | Gunkel et al. | 558/146 |

FOREIGN PATENT DOCUMENTS

| | | |
|---|---|---|
| 0 248 346 | 12/1987 | European Pat. Off. . |
| 0 329 560 | 8/1989 | European Pat. Off. . |
| 0 573 082 | 12/1993 | European Pat. Off. . |
| 0 611 388 | 8/1994 | European Pat. Off. . |
| 0 741 179 | 11/1996 | European Pat. Off. . |
| 2 505 861 | 11/1982 | France . |
| 196 23 268 | 12/1996 | Germany . |
| 58-224185 | 12/1983 | Japan . |
| 59-93778 | 5/1984 | Japan . |
| 1-174588 | 7/1989 | Japan . |
| 2-85655 | 3/1990 | Japan . |
| 2-147689 | 6/1990 | Japan . |
| 2-296888 | 12/1990 | Japan . |

(List continued on next page.)

OTHER PUBLICATIONS

Brasher et al, "Sodium dodeca–molybdophosphate as a corrosion inhibitor in aqueous solution", Br. Corros. J., vol. 4, pp. 74–79, Mar. 1969.

Chemical Abstracts, 121:25617, "Solid–phase redox reaction of 12th series heteropoly acids with sodium, potassium, and calcium chlorides", Pak et al., no month available 1994.
Simpson, "Second generation corrosion inhibitors", Polymer Paint Colour J. 185(4371), pp. 23–24, Sep. 1995.
Grant & Hackh's Chemical Dictionary, p. 282, definition of "heteropoly acids", 1987 no month available.
Russian Patent Abstract 1685970, Oct. 1991.
L.E.Tsygankova et al., Zaschita Metallov 2777: 344–347 (1991) (English Translation). No date available.
Tsygankova et al., "Protection of Steel by Hydroxyquinoline Films from Corrosion in Lithium Bromide Solutions," *Protection of Metals*, vol. 27, No. 2, Mar. 1, 1991, pp. 288–291.
JP 01 155 157 A, WPI/Derwent Abstract, Jun. 19, 1989.
Sastri et al., "Surface Analysis in Corrosion Inhibition Mechanisms," *Werkstoffe Und Korrosion*, vol. 39, No. 2, pp. 77–82, Feb. 1987, West Germany.
Granese et al., "The Inhibition Action of Heterocyclic Nitrogen Organic Compounds on Fe and Steel in HCl Media," *Corrosion Science*, vol. 33, No. 9, pp. 1439–1453, Sep. 1992, UK.
Chemical Abstracts, vol. 126, No. 3, Jan. 20, 1997, Columbus, Ohio, abstract No. 34170, Gorski et al: "Brake Fluid," & PL 166 099 A.
Tanno et al., "The Corrosion of Carbon Steel in Lithium bromide Solution at Moderate Temperatures," *Corrosion Science*, vol. 34, No. 9, pp. 1441–1451, Sep. 1993.
Japanese Patent Abstract 5228327, Sep. 1993.
K.Aramaki and H.Nishihara, Fac. Sci. Technol., Keio Univ., Yokohama, 223, Japan 10(7):207–11 (1992) no month available.
Japanese Patent Abstract 6221728, Aug. 1994.
Japanese Patent Abstract 2296888, Dec. 1990.
Japanese Patent Abstract 59117577, Jul. 1984.
C. Simpson, "Second Generation Corrosion Inhibitors", *Polymer Paint Colour J.*, 185(4371), pp. 23–24, Sep. 1995.
Japanese Patent Abstract 59200769, Nov. 1984.
L.V. Tumurova, E.V. Kvashnina and M.V. Mokhosoev, Zashch. Met. 26(3), 437–9 (1990) (abstract only) no month available.
D.M. Brasher et al., "Sodium dodeca–Molybdophosphate as a Corrosion Inhibitor in Aqueous Solution", *Br. Corros. J.*, vol. 4, pp. 74–79, Mar., 1969.
A. Weisstuch et al., "An Electrochemical Study of Heteropoly Molybdates as Cooling Water Corrosion Inhibitors", *Corrosion–Nace*, vol. 28, No. 8, pp. 299–306, Aug. 1972.

(List continued on next page.)

*Primary Examiner*—Christine Skane
*Attorney, Agent, or Firm*—Alston & Bird LLP

[57] ABSTRACT

Anticorrosion solutions and processes useful for refrigeration processes are disclosed. Heteropoly complex anions of transitional metal elements can be added to an absorption refrigeration solutions which includes at least one alkali metal halide or similar compounds, or mixtures thereof, in combination with transition metal compounds or compounds of the metallic elements of Groups IIIa to VIa of the Periodic Table of Elements to minimize corrosion of the refrigeration system.

30 Claims, 3 Drawing Sheets

FOREIGN PATENT DOCUMENTS

| | | |
|---|---|---|
| 5-214326 | 8/1993 | Japan . |
| 7-138559 | 5/1995 | Japan . |
| 8-75292 | 3/1996 | Japan . |

OTHER PUBLICATIONS

Patent Abstracts of Japan vol. 007, No. 285 (C–201), Dec. 20, 1983 and JP 58 164792 A (Otsuka Kagaku Yakuhin KK) Sep. 29, 1983.

Pikel'nyi et al; "The Kinetics and Mechanism of Corrosion in the Presence of Heteropolycompounds", Protection of Metals, vol. 30, No. 4, p. 385/386 XP000466629, Jul./Aug. 1994.

Lomakina et al; "Heteropoly Anions as Corrosion Inhibitors for Aluminum in High Temperature Water", *Werkstoffe Und Korrosion*, vol. 46, No. 7, p. R111, 95–1230, XP000517821 (Jul.,1995).

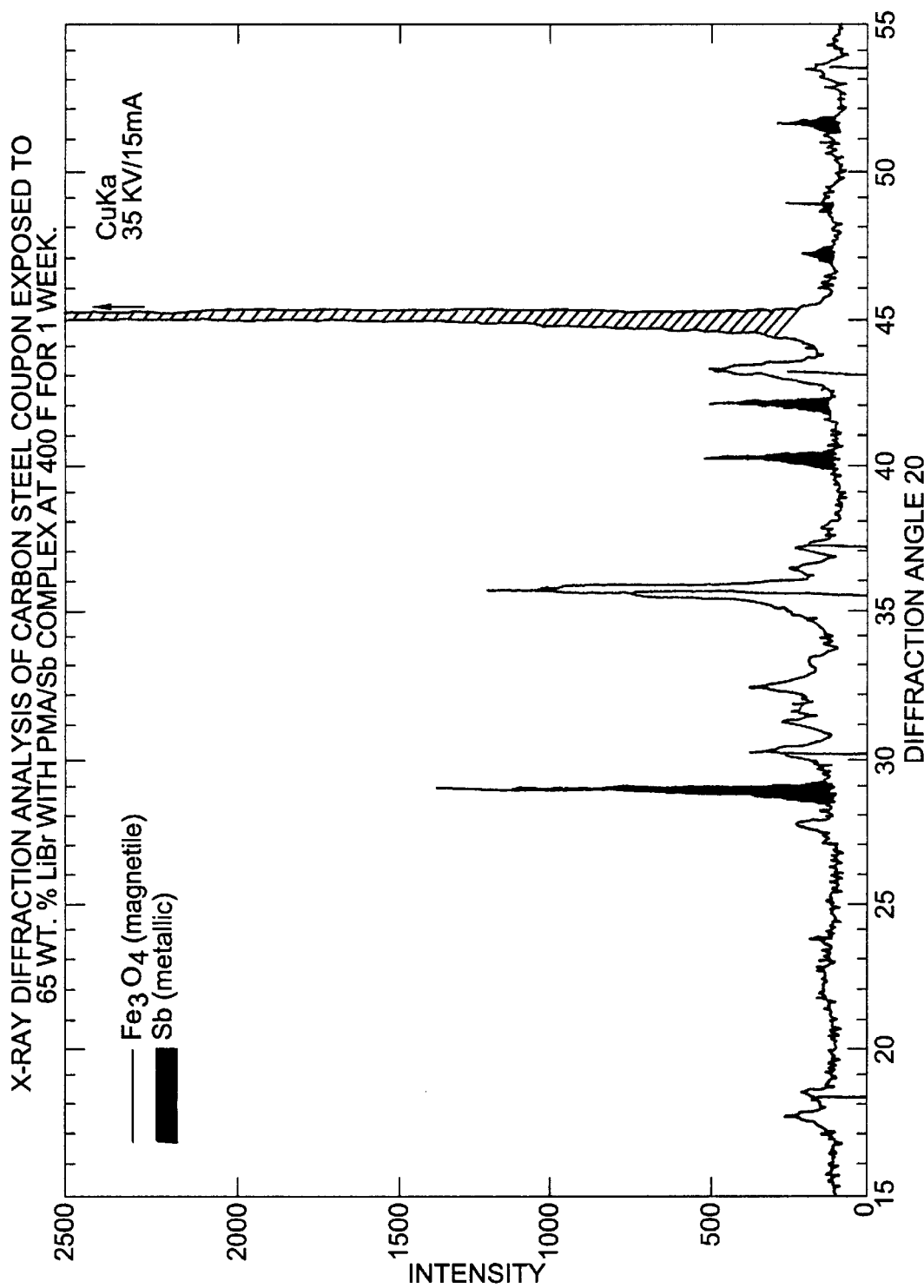

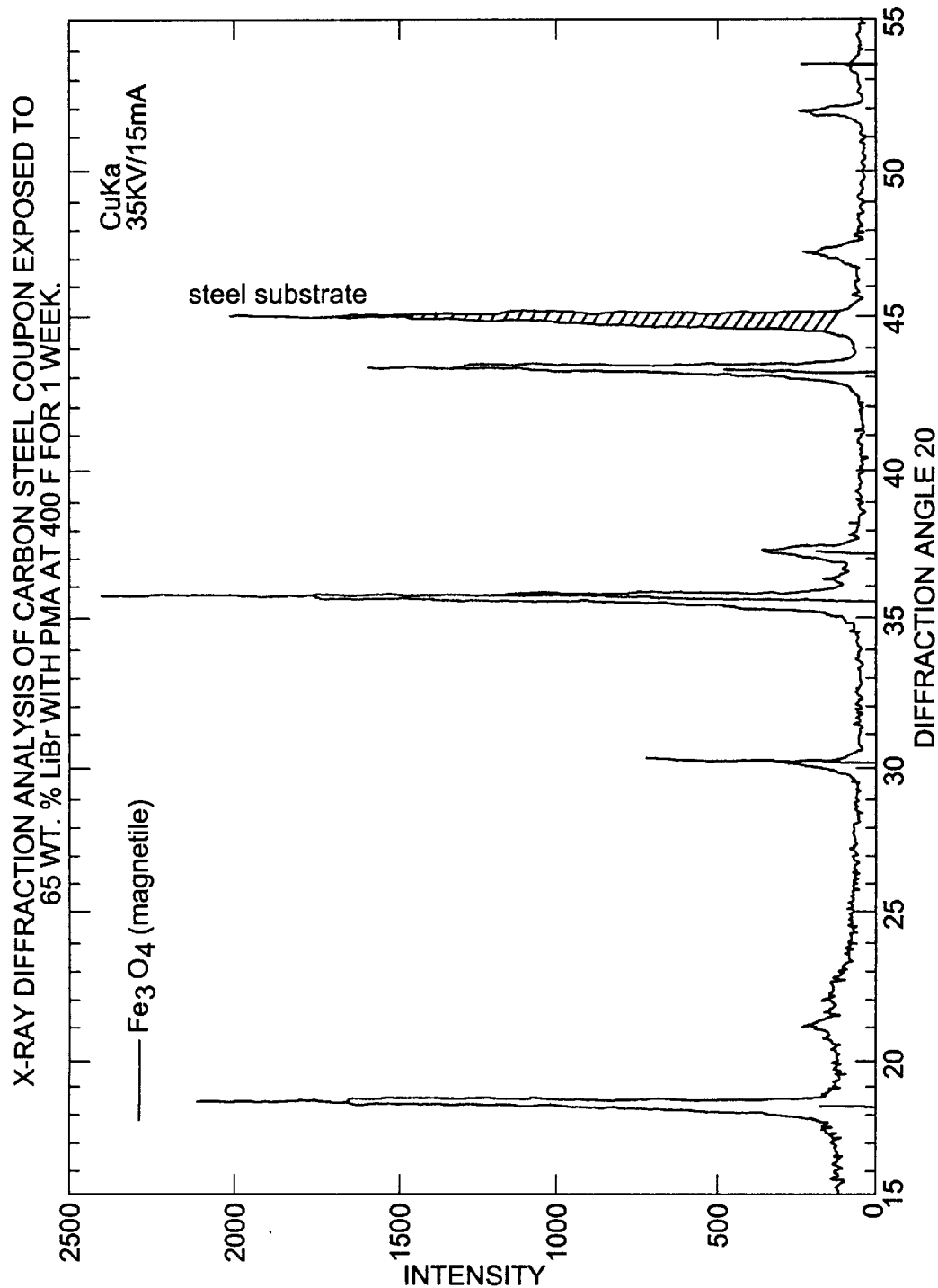

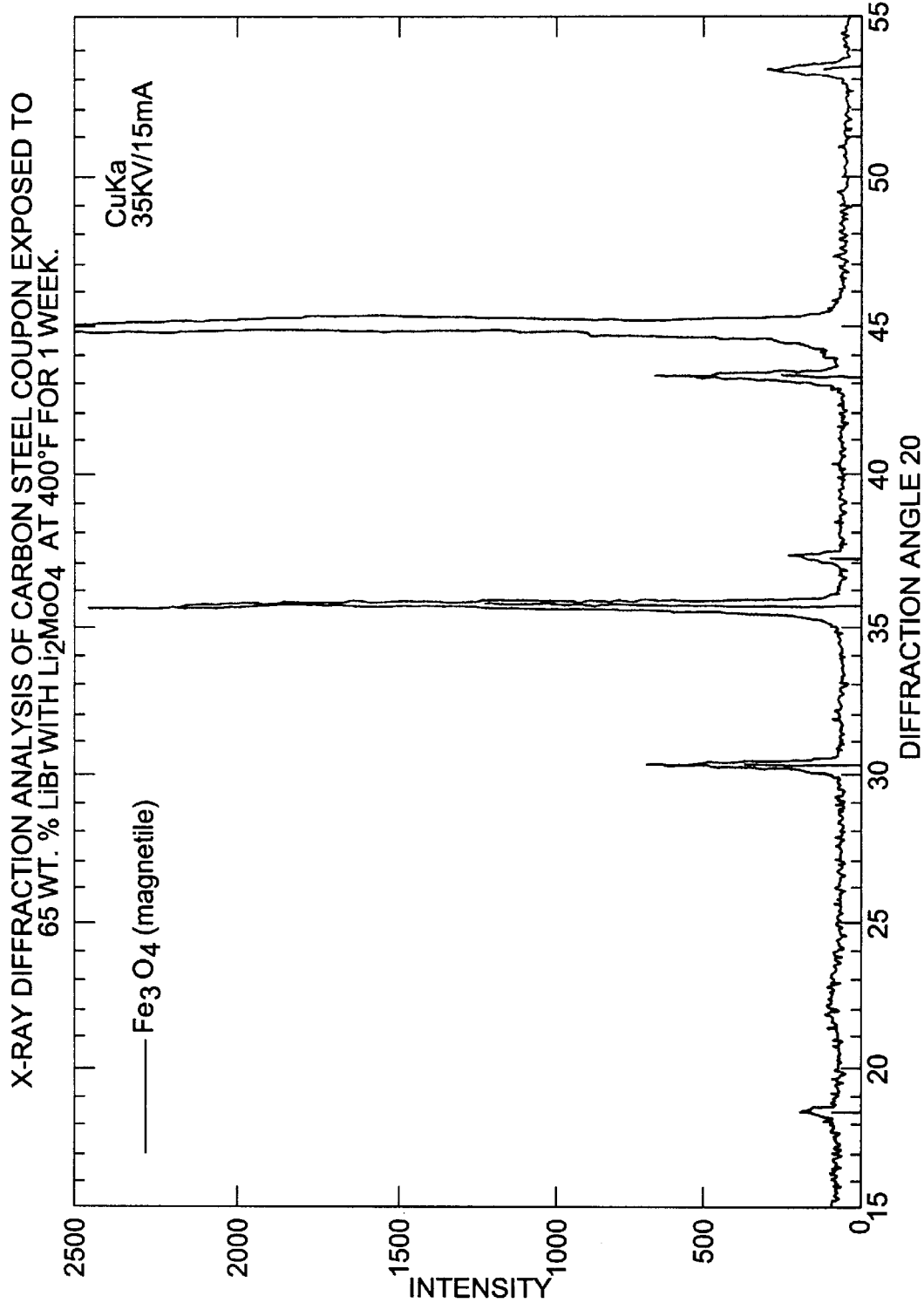

CORROSION INHIBITING SOLUTIONS AND PROCESSES FOR REFRIGERATION SYSTEMS COMPRISING HETEROPOLY COMPLEX ANIONS OF TRANSITION METAL ELEMENTS ADDITIONAL ADDITIVES

CROSS-REFERENCE TO RELATED APPLICATIONS

This application is related to commonly owned copending provisional application Serial No. 60/053,099, filed Jul. 26, 1997, and claims the benefit of the earlier filing date of this application under 35 U.S.C. § 119(e).

FIELD OF THE INVENTION

This invention relates generally to solutions for refrigeration systems, and in particular to absorption solutions which include corrosion inhibiting agents.

BACKGROUND OF THE INVENTION

Alkali metal halides, such as lithium bromide, are used in absorbent fluids in absorption refrigeration machines. An exemplary alkali metal halide solution for absorption refrigeration applications is a lithium bromide solution, adjusted to pH range of 7–13 with lithium hydroxide.

Although this and other types of absorption solutions can be advantageous for the refrigeration cycles, alkali metal halides can be corrosive toward the materials used to construct the refrigeration machine. Such materials can include mild and stainless steel for containment components and copper or copper-nickel alloys for tube bundles, among others.

In addition to the surface damage caused by corrosion, the corrosion reaction evolves hydrogen gas as a byproduct. Incondensibles in the form of atoms or ions can easily enter and diffuse into metals, resulting in the degradation of their mechanical properties under certain conditions.

The severity of corrosion can vary depending upon factors such as temperatures of the system, concentration of alkali metal halide in the absorption solution, metals used in the construction of the refrigeration unit, the presence of air, and the like. For example, during use, the internal temperature of such machines can be high, typically up to about 450° F. and higher, depending on the type of the absorption cycle, which can increase the corrosive effect of the alkali metal halide solution.

Various additives, such as lithium chromate, lithium nitrate, and lithium molybdate, have been proposed as corrosion inhibitors in alkali metal halide absorption solutions. However, lithium chromate can raise environmental concerns, and its use is being phased out. Further, the level of chromate and its oxidation state must be carefully maintained. If too little chromate is used, then it does not properly passivate the whole metal surface and pitting can result. Lithium nitrate can potentially evolve ammonia, which can cause stress corrosion cracking of copper based alloys such as heat exchanger tubes. Lithium molybdate exhibits only limited solubility in alkali metal halide solutions. In addition, lithium molybdate is metastable in aqueous halide solutions. Thus it can be difficult to maintain in aqueous halide solutions and to maintain a constant concentration of molybdate ions in solution.

Pending U.S. patent application Ser. No. 08/882,771, filed Jun. 26, 1997, titled "Corrosion Inhibiting Solutions for Refrigeration Systems," is directed to the use of heteropoly complex anions of transitional elements as corrosion inhibition additives. Refrigeration absorption fluid formulations which included heteropoly complex anions as a component exhibited improved corrosion inhibition properties and low generation of hydrogen gas that is evolved due to the corrosion reaction of alkali halide solutions with the materials of construction of the refrigeration machine. Pending U.S. patent application Ser. No. 08/896,110, filed Jul. 17, 1997, titled "Corrosion Inhibiting Solutions for Refrigeration Systems," is directed to the use of halide compounds of metallic elements of group Va, and demonstrated that alkali halide formulations containing these elements offer improved corrosion protection and low hydrogen as compared to conventional corrosion inhibitors.

SUMMARY OF THE INVENTION

The present invention provides alkali metal halide solutions, preferably lithium halide solutions, and more preferably lithium bromide solutions, which are useful as absorption fluids in refrigeration machines. The absorption solution contains a mixture of at least one heteropoly complex anion of transition metal elements with at least one other transition metal compound. Alternatively, the absorption solution contains a mixture of at least one heteropoly complex anion with at least one compound of the metallic elements of the groups IIIa to VIa of the Periodic Table of Elements.

The compositions of the invention containing a mixture of corrosion inhibitors provide improved corrosion protection for the materials of construction of the refrigeration machine. The alkali halide formulations of this invention which contain the mixture of additives also provide a more stable formulation over those containing only the heteropoly complex anions. Still further, use of the absorption solutions on a refrigeration machine can result in a protective layer containing magnetite (iron oxide) formed on carbon steel. The inventors have found that protective layer which forms as a result of using the solutions of the invention can be more corrosion resistant than oxide layers formed in the presence of conventional corrosion inhibitors, such as lithium molybdate, in which magnetite films tend to be more amorphous and less developed.

BRIEF DESCRIPTION OF THE DRAWINGS

Some of the features and advantages of the invention having been described, others will become apparent from the detailed description which follows, and from the accompanying drawings, in which:

FIG. 1 is an X-ray diffraction pattern of a surface layer formed on carbon steel coupons exposed to a 65 wt. % LiBr solution which included heteropoly molybdate anion/antimony complex at 400° F. for one week;

FIG. 2 is an X-ray diffraction pattern of a surface layer formed on carbon steel coupons exposed to a 65 wt. % LiBr solution which includes a heteropoly molybdate anion at 400° F. for one week; and FIG. 3 is an X-ray diffraction pattern of a surface layer formed on carbon steel coupons exposed to a 65 wt. % LiBr solution which includes lithium molybdate at 400° F. for one week.

DETAILED DESCRIPTION OF THE INVENTION

The heteropoly complex anions of transition metal elements can be generally described as coordination-type salts and free acids with a complex and high molecular weight anion. The heteropoly complex anions include as a ligand or complexing agent at least one transition metal atom which, as an ion in solution, exhibits corrosion inhibiting properties in absorption refrigeration systems. The heteropoly complex anions useful in the solutions of the invention also are preferably substantially completely soluble in alkali metal halide solutions, such as lithium bromide solutions, so as to maximize the concentration of the corrosion inhibiting ions in solution. The heteropoly anions contains complexed transition metal atoms (such as Mo). Therefore, the dissolved heteropoly anions can provide a higher level of transition metal anions (Mo anions) in a solution, as compared to simple transition metal oxides, such as molybdates like lithium molybdate.

Any of the heteropoly complex anions known in the art can be used in the invention, including compounds described in the above-referenced U.S. patent application Ser. No. 08/882,771, filed Jun. 26, 1997, the entire disclosure of which is incorporated herein by reference. Such complexes can be generally represented by the following formulas:

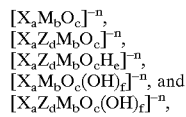

$$[X_aM_bO_c]^{-n},$$
$$[X_aZ_dM_bO_c]^{-n},$$
$$[X_aZ_dM_bO_cH_e]^{-n},$$
$$[X_aM_bO_c(OH)_f]^{-n}, \text{ and}$$
$$[X_aZ_dM_bO_c(OH)_f]^{-n},$$

wherein:

X and Z are central heteroatoms from Groups I–VIII of the Periodic Table of Elements;

the value of a varies and is 1 or 2;

the value of d varies and is an integer from 0 to 4;

$M_bO_c$, $M_bO_cH_e$, and $M_bO_c(OH)_f$ are oxoanions in which M is a transition metal element; the value of b varies, depending upon the number of transition metal atoms present in the oxoanion and can be an integer from 5 to 22, preferably 6 to 12; the value of c varies, depending upon the number of oxygen atoms present in the oxoanion attached to the transition metal and also capable of forming unique structural groups with the central atoms, and is an integer from 20 to 70, preferably from 24 to 40; the value of e varies (for example in the reduced heteropolyanion, the value of e varies depending upon the reduction of the heteropolyanion) and is an integer from 0 to 6; and the value of f varies and is an integer from 0 to 3; and n is the charge of the anion and is the sum of the charges on X, Z, M, O, H, and OH.

Although the above formulas are general representations of the heteropoly complex anions useful in the invention, as will be appreciated by the skilled artisan, other compounds can also be included. Also as these formulas represent, in some heteropoly complex anions, H atoms in addition to the O atoms have been reported. Any of the various heteropoly complex anions known in the art can be used in the invention, including compounds described by G. A. Tsigdinos, Topics Curr. Chem., vol. 76, 5–64 (1978) and D. L. Kepert, Comprehensive Inorganic Chemistry (A. F. Trofman et al.) Oxford:Pergamon Press, vol. 4, pp. 607 (1973), the entire disclosure of each of which is incorporated herein by reference.

With regard to the central or heteroatom X, over 40 different elements (both metals and nonmetals) from Periodic Groups I–VIII can function as central atoms in distinct heteropoly complex anions. Exemplary central atoms include, but are not limited to, ions of phosphorus, silicon, manganese, arsenic, boron, iron, tellurium, copper, zinc, aluminum, tin, zirconium, titanium, vanadium, antimony, bismuth and chromium, and the like.

M is a 2–18 hexavalent transition metal element atom, which surrounds one or more central atoms X. The transition metal atom M is selected from those elements which as ions in solution provide corrosion inhibiting effect in absorption refrigeration systems. Preferably the transition metal element M in the oxoanion is derived from molybdate or tungstate. Other transition metal elements can also be present, as represented in the formula as Z, such as but not limited to, manganese, cobalt, nickel, copper, zinc, vanadium, niobium, tantalum and other transition elements.

Exemplary heteropoly complex anions include, but are not limited to, phosphomolybdates, such as but not limited to, $[PMo_{12}O_{40}]^{-3}$, wherein $P^{+5}$ is the central atom or heteroatom, $[PMo_{10}V_2O_{40}]^{-5}$, and the like; silicon molybdates, such as but not limited to, $[SiMo_{11}NiO_{40}H_2]^{-6}$, wherein $Si^{+4}$ is the central atom; manganese molybdates, such as but not limited to, $[MnMo_9O_{32}]^{-6}$, wherein $Mn^{+4}$ is the central atom; silicon tungstates, such as but not limited to, $[SiW_{12}O_{40}]^{-4}$, wherein $Si^{+4}$ is the central atom; tellurium molybdates, such as but not limited to, $[TeMo_6O_{24}]^{-6}$, wherein $Te^{+6}$ is the central atom; arsenic molybdates, such as but not limited to, $[As_2Mo_{18}O_{62}]^{-6}$, wherein $As^{+5}$ is the central atom; manganese niobiates, such as but not limited to, $[MnNb12O_{36}]^{-12}$, wherein $Mn^{+4}$ is the central atom; and the like, and mixtures thereof. Currently preferred heteropoly complex anions are phosphomolybdates.

The heteropoly complex anions which have been structurally characterized can be divided into the broad groups, depending upon the heteroatom [X], transition metal atom [M] stoichiometry, and upon the coordination number of the heteroatom (that is, the number of points at which M is attached to the heteroatom in the complex). The heteropoly complex anions can be classified according to the ratio of the number of the central atoms to the peripheral molybdenum or other such atoms. For example, the different types of known heteropoly complex anions of molybdate show the following X:M ratio with one or more central atoms: X:M= 1:12, 1:11, 1:10, 1:9, 1:6, 2:10, 2:17, 2:5, 4:12, 1m:6m (m unknown) and 1:1 heteropoly complex anions. The known tungstates include all of the above in addition to 2:18, 2:17 and 2:4:18.

In a preferred embodiment of the invention, the transition metal of the heteropoly complex anion is molybdenum or tungsten, and more preferably molybdenum. A particularly preferred solution includes the heteropoly complex anion $[PMo_{12}O_{40}]^{-3}$.

Transition metal compounds useful in the invention are selected from compounds of transition metals which are capable of providing the transition metal element as ions in alkali metal halide solutions, such as lithium bromide solutions, for complexing with the chosen heteropoly anion. Preferably, the transition metal element of the transition metal compound is different from the transition metal of the heteropoly anion complex. Exemplary transition metal compounds include nitrates, halides, oxides and the like, preferably a halide, of the transition metal elements such as cobalt, nickel, tungsten, zirconium, manganese, chromium, and the like, and mixtures thereof.

The compounds of the metallic elements of Groups IIIa to VIa of the Periodic Table of Elements are also selected from compounds which are capable of providing the metallic elements of Group IIIa to VIa as ions in alkali metal halide solutions. Exemplary compounds of the metallic elements of Groups IIIa to VIa include oxides, sulfides, halides, and the like, preferably a halide, of metallic elements of Group IIIa to VIa, such as antimony and the like. For example, the above-referenced U.S. patent application Ser. No. 08/896,110, filed Jul. 17, 1997, describes halides of metallic elements of Group Va of the Periodic Table of Elements which can be useful in the invention, although other compounds can also be useful in this invention. Exemplary halides of Group Va metallic elements (i.e., arsenic, antimony, and bismuth) include antimony bromide, arsenic bromide, and bismuth bromide, and the like and mixtures thereof. The entire disclosure of pending U.S. application Ser. No. 08/896,110, filed Jul. 17, 1997, is incorporated herein by reference.

The heteropoly complex anions, transition metal compounds and compounds of metallic elements of Groups IIIa and VIa are present in the compositions of the invention in amounts sufficient to provide the desired corrosion inhibiting effect. This amount can vary depending upon various factors, such as the solubility of the compounds the absorption solution, the nature of the ions, temperatures of the environment of the refrigeration machine, concentration of the alkali metal halide solution, metals used in the construction of the refrigeration unit, the presence of air, and the like. Preferably, the absorption solutions of the invention include at least one heteropoly complex anion in an amount ranging from about 100 parts per million (ppm) to about 3000 ppm, more preferably about 200 ppm to about 800 ppm. Transition metal compounds or compounds of the metallic elements of Group IIIa to VIa can be present in the solutions in amounts ranging from about 10 parts per million (ppm) to about 3000 ppm.

The absorption solutions include alkali metal halide in conventional amounts. An exemplary alkali metal halide solution includes alkali metal halide in an amount from about 40 to about 65 weight percent, based on the total weight of the solution. The alkali metal halide can be, for example, lithium halide, preferably lithium bromide, although the absorption solution can include other alkali metal halides, such as lithium chloride, lithium iodide, as well as mixtures of these. Further, the absorption solution can include lithium nitrate. Still further, the absorption solution can include other halides, such as zinc halides, which can be particularly useful in high temperature applications (generally about 450° F. and higher). For these formulations, the solution pH can be adjusted between 7–13 with lithium hydroxide.

The present invention also provides processes for inhibiting the corrosion of a refrigeration machine resulting from the presence of alkali metal halide absorbent solutions. In the process of the invention, the above described alkali metal halide solution which include a mixture of a heteropoly anion complexed with a transition metal compound or a compound of the metallic elements of Groups IIIa to VIa is circulated in a refrigeration machine under conditions and in amounts sufficient to provide a corrosion inhibiting effect. As the skilled artisan will appreciate, the environment or conditions, such as temperature and/or pressure, of different refrigeration machines can vary. Typically, the temperature of the machine ranges from about 150° F. to about 550° F., although the temperature can be outside this range as well.

The present invention will be further illustrated by the following non-limiting examples.

EXAMPLE 1

Table 1 presents results of this invention where the LiBr formulation contains a complex of the heteropoly anion (PMA—phosphomolybdic acid) and antimony. Tests were performed in a pressure vessel autoclave with temperature control (+/−2° F.). A concentrated (65 wt. %) lithium bromide solution was prepared using anhydrous lithium bromide and deionized water. The alkalinity of the solution was adjusted with lithium hydroxide to control the solution pH at a level that optimized the performance of each chemical or generally accepted in the industry.

Pre-weighed metal coupons were placed in and above the lithium bromide solution contained in a 2 liter cylinder made of Inconel-600 material which fits into the furnace. The cylinder containing the absorption solution was evacuated (to about 29.6 inches of Hg) using a vacuum pump prior to starting the test. The solution was heated to a specified temperature and held at that temperature for a period of 168 hours.

Upon completion, the test coupons were removed and cleaned by ASTM method G1-90. The corrosion rate was calculated from the weight loss. The results are set forth in Table 1. Hydrogen generation was also calculated for carbon steel in 65 wt. % LiBr in 168 hours for various additives. These results are set forth in Table 2.

TABLE 1

| Additive | Corrosion Rate (mils per year) for Carbon Steel at | | |
|---|---|---|---|
|  | 350° F. | 400° F. | 450° F. |
| None | 60 | 118 | 132 |
| Lithium molybdate (199 ppm) pH = 11–13 | 10 | 12 | 14 |
| PMA (300 ppm) pH = 11–13 | 2.0 | 5 | 8 |
| PMA/Sb complex (444 ppm) pH = 11–13 | 2.4 | 4 | 4 |
| PMA/Sb complex (876 ppm) pH = 11–13 | — | 1.2 | — |

TABLE 2

| Additive | Hydrogen Generation (mg/in$^2$ of Carbon Steel) at | | |
|---|---|---|---|
|  | 350° F. | 400° F. | 450° F. |
| None | 27 | 36 | 37 |
| Lithium molybdate (199 ppm) pH = 11–13 | 2.0 | 6.9 | 7.9 |
| PMA (300 ppm) pH = 11–13 | 1.8 | 0.9 | 5.0 |
| PMA/Sb complex (444 ppm) pH = 11–13 | 0.03 | 0.1 | 0.4 |
| PMA/Sb complex (876 ppm) pH = 11–13 | — | 0.3 | — |

EXAMPLE 2

The stability of PMA in lithium bromide solutions was also evaluated as follows. A 55 wt. % lithium bromide solution was prepared using anhydrous lithium bromide and deionized water. The alkalinity of the solution was adjusted with lithium hydroxide to control the solution pH at a level that optimized the performance of each chemical or generally accepted in the industry. The test results, set forth in Table 3 below, demonstrate that PMA is more stable in LiBr solution as a complex with antimony compounds.

TABLE 3

| Days at 25° C. | Solution with PMA/Sb complex PMA (ppm) | Solution with only PMA PMA (ppm) |
|---|---|---|
| 0 | 326 | 331 |
| 30 | 321 | 312 |
| 60 | 307 | 269 |

EXAMPLE 3

The surface of carbon steel coupons treated in formulations containing PMA in combination with antimony complex, PMA alone, and lithium molybdate ($Li_2MoO_4$) were analyzed using X-ray diffraction. The X-ray diffraction measurements were carried out on a wide angle diffractometer using CuKα radiation with a diffracted beam monochromator.

FIG. 1 presents the X-ray diffraction pattern of a surface coating formed on a carbon steel metal coupon exposed to a LiBr solution (65 wt. %) which included $PMA/SbBr_3$ complex at 400° F. for one week, and specifically of a specific area of the metal coupon where a protective coating was formed. The peaks seen in the spectra identify elemental antimony as the major phase in the coating with magnetite ($Fe_3O_4$).

FIG. 2 is the X-ray diffraction pattern of a surface layer formed on a carbon steel coupon exposed to a LiBr solution (65 wt. %) which included just PMA at 400° F. for one week. FIG. 3 is an X-ray diffraction pattern of a surface layer formed on carbon steel coupons exposed to a lithium bromide (65 wt. %) which included lithium molybdate at 400° F. for one week.

Both coupons of FIGS. 2 and 3 show peaks that match well with the magnetite ($Fe_3O_4$) lines. However, the peaks at 161, 222, and 400 are much stronger in the case of PMA and PMA/Sb complex, suggesting more stable magnetite. On the PMA exposed coupon peaks indicating the presence of some FeOOH (geothite and lepidocrocite) phases are also seen. These may be intermediate phases leading to the formation of more stable magnetite. No such phases were seen in the case of the coupon exposed to $Li_2MoO_4$/LiBr formulation.

The foregoing examples are illustrative of the present invention and are not to be construed as limiting thereof.

What is claimed is:

1. An absorption solution for refrigeration systems, comprising:
   at least one alkali metal halide in an amount of at least 20 percent by weight based on the total weight of the solution,
   at least one heteropoly complex anion of a transition metal element, said heteropoly complex anion comprising a compound selected from the group consisting of $[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, $[X_aZ_dM_bO_c(OH)_f]^{-n}$, and mixtures thereof, wherein:
   X and Z are central heteroatoms selected from the group consisting of tellurium and elements of Groups IVB, VB, VIB, VIIB, VIIIB, IB, IIB, IIIA, IVA, and VA of the Periodic Table of Elements;
   a is 1 or 2;
   d is an integer from 0 to 4;
   $M_bO_c$, $M_bO_cH_e$, and $M_bO_c(OH)_f$ are oxoanions in which M is a transition metal element selected from the group consisting of molybdenum and tungsten; b is an integer from 5 to 22; c is an integer from 20 to 70; e is an integer from 0 to 6; and f is an integer from 0 to 3; and n is the charge of the anion, and
   at least one additional additive comprising a compound selected from the group consisting of nitrates, halides, and oxides of transition metal elements, compounds of the metallic elements of Groups IIIa to VIa of the Periodic Table of Elements capable of providing a metallic element of Group IIIa to VIa as an ion in alkali metal halide solutions, and mixtures thereof,
   wherein said at least one heteropoly complex anion of a transition metal element and said at least one additional additive are present in an amount sufficient to provide a corrosion inhibiting effect.

2. The solution of claim 1, wherein:
   X is a central heteroatom selected from the group consisting of phosphorus, silicon, manganese, arsenic, boron, iron, tellurium, copper, zinc, aluminum, tin, zirconium, titanium, vanadium, antimony, bismuth, and chromium; and
   Z is a central heteroatom selected from the group consisting of manganese, cobalt, nickel, copper, zinc, vanadium, niobium, and tantalum.

3. The solution of claim 1, wherein X is phosphorus, silicon, manganese, tellurium or arsenic.

4. The solution of claim 1, wherein said at least one heteropoly complex anion is selected from the group consisting of phosphomolybdates, silicon molybdates, manganese molybdates, silicon tungstates, tellurium molybdates, arsenic molybdates, and mixtures thereof.

5. The solution of claim 1, wherein said at least one heteropoly complex anion comprises a phosphomolybdate of the formula $[PMo_{12}O_{40}]^{-3}$.

6. The solution of claim 1, wherein said at least one additional additive comprises a nitrate, halide, or oxide of a transition metal element, said transition metal element of said nitrate, halide, or oxide being different from the transition metal of the heteropoly complex anion.

7. The solution of claim 1, wherein said at least one additional additive comprises a nitrate, halide, or oxide of a transition metal element, said transition metal element of said nitrate, halide, or oxide being selected from the group consisting of cobalt, nickel, tungsten, zirconium, manganese, chromium, and mixtures thereof.

8. The solution of claim 1, wherein said at least one additional additive comprises a halide of a transition metal element.

9. The solution of claim 1, wherein said at least one additional additive comprises at least one compound of the metallic elements of Groups IIIa to VIa of the Periodic Table of Elements, said at least one compound of the metallic elements of Groups IIIa to VIa of the Periodic Table of Elements comprising at least one oxide, sulfide, halide, or a mixture thereof of metallic elements of Group IIIa to VIa.

10. The solution of claim 9, wherein said at least one compound of the metallic elements of Groups IIIa to VIa of the Periodic Table of Elements comprises a halide of a metallic element of Groups IIIa to VIa of the Periodic Table of Elements.

11. The solution of claim 9, wherein said at least one compound of the metallic elements of Groups IIIa to VIa of the Periodic Table of Elements comprises antimony as the metallic element of Groups IIIa to VIa of the Periodic Table of Elements.

12. The solution of claim 9, wherein said at least one compound of the metallic elements of Groups IIIa to VIa of the Periodic Table of Elements comprises a compound selected from the group consisting of antimony bromide, arsenic bromide, and bismuth bromide, and mixtures thereof.

13. The solution of claim 1, wherein said alkali metal halide is present in an amount of about 40 to about 65 percent by weight based on the total weight of the solution.

14. The solution of claim 1, wherein said at least one heteropoly complex anion is present in an amount of about 200 ppm to about 800 ppm.

15. An absorption solution for refrigeration systems, comprising lithium bromide in an amount of at least 20 percent by weight based on the total weight of the solution, at least one heteropoly complex anion of a transition metal element, said at least one heteropoly complex anion selected from the group consisting of phosphomolybdates, silicon molybdates, manganese molybdates, silicon tungstates, tellurium molybdates, arsenic molybdates, and mixtures thereof, and at least one additional additive comprising a compound selected from the group consisting of nitrates, halides, and oxides of transition metal elements and oxides, sulfides, and halides of the metallic elements of Groups IIIa to VIa of the Periodic Table of Elements, wherein said at least one heteropoly complex anion of a transition metal element and said at least one additional additive are present in an amount sufficient to provide a corrosion inhibiting effect.

16. The solution of claim 15, wherein said at least one heteropoly complex anion of a transition metal element comprises a phosphomolybdate, and said least one additional additive comprises at least one transition metal halide.

17. The solution of claim 16, wherein said at least one transition metal halide comprises at least one halide of cobalt, nickel, tungsten, zirconium, manganese, chromium, and mixtures thereof.

18. The solution of claim 15, wherein said at least one heteropoly complex anion of a transition metal element comprises a phosphomolybdate and said at least one additional additive comprises at least one halide of a metallic element of Group IIIa to VIa.

19. The solution of claim 18, wherein said at least one halide comprises a halide of the metallic elements of Group Va of the Periodic Table of Elements.

20. The solution of claim 19, wherein said halide comprises antimony bromide ($SbBr_3$), arsenic bromide, or bismuth bromide.

21. The solution of claim 15, wherein said at least one heteropoly complex anion of a transition metal element is $[PMo_{12}O_{40}]^{-3}$.

22. An absorption solution for refrigeration systems, comprising lithium bromide in an amount of at least 20 percent by weight based on the total weight of the solution, at least one phosphomolybdate of formula $[PMo_{12}O_{40}]^{-3}$, and at least one cobalt halide or nickel halide, said phosphomolybdate and said cobalt or nickel halide present in an amount sufficient to provide a corrosion inhibiting effect.

23. An absorption solution for refrigeration systems, comprising lithium bromide in an amount of at least 20 percent by weight based on the total weight of the solution, at least one phosphomolybdate of formula $[PMo_{12}O_{40}]^{-3}$, and antimony bromide ($SbBr_3$), said phosphomolybdate and said antimony bromide present in an amount sufficient to provide a corrosion inhibiting effect.

24. A process for inhibiting the corrosion of a refrigeration machine resulting from the presence of alkali metal halide absorbent solutions, comprising circulating in a refrigeration machine an absorption solution comprising:

at least one alkali metal halide in an amount of at least 20 percent by weight based on the total weight of the solution, at least one heteropoly complex anion of a transition metal element, said heteropoly complex anion comprising a compound selected from the group consisting of $[X_aM_bO_c]^{-n}$, $[X_aZ_dM_bO_c]^{-n}$, $[X_aZ_dM_bO_cH_e]^{-n}$, $[X_aM_bO_c(OH)_f]^{-n}$, $[X_aZ_dM_bO_c(OH)_f]^{-n}$, and mixtures thereof, wherein:

X and Z are central heteroatoms selected from the group consisting of tellurium and elements of Groups IVB, VB, VIB, VIIB, VIIIB, IB, IIB, IIIA, IVA, and VA of the Periodic Table of Elements;

a is 1 or 2;

d is an integer from 0 to 4;

$M_bO_c$, $M_bO_cH_e$, and $M_bO_c(OH)_f$ are oxoanions in which M is a transition metal element selected from the group consisting of molybdenum and tungsten; b is an integer from 5 to 22; c is an integer from 20 to 70; e is an integer from 0 to 6; and f is an integer from 0 to 3; and n is the charge of the anion, and at least one additional additive comprising a compound selected from the group consisting of nitrates, halides, and oxides of transition metal elements, compounds of the metallic elements of Groups IIIa to VIa of the Periodic Table of Elements capable of providing a metallic element of Group IIIa to VIa as an ion in alkali metal halide solutions, and mixtures thereof, wherein said at least one heteropoly complex anion of a transition metal element and said at least one additional additive are present in an amount sufficient to provide a corrosion inhibiting effect.

25. The process of claim 24, wherein during said circulating step, said at least one heteropoly complex anion and said at least one additional additive form a protective layer on a surface within said machine.

26. The process of claim 24, wherein during said circulating step said solution is exposed to temperatures ranging from about 150° F. to about 550° F.

27. The process of claim 24, wherein said absorbent solution further comprises a compound selected from the group consisting of lithium nitrate, zinc halide, and mixtures thereof.

28. The solution of claim 24, wherein said alkali metal halide is present in an amount of about 40 to about 65 percent by weight based on the total weight of the solution.

29. The process of claim 24, wherein said at least one heteropoly complex anion is present in an amount of about 200 ppm to about 800 ppm.

30. The process of claim 24, wherein:

X is a central heteroatom selected from the group consisting of phosphorus, silicon, manganese, arsenic, boron, iron, tellurium, copper, zinc, aluminum, tin, zirconium, titanium, vanadium, antimony, bismuth, and chromium; and Z is a central heteroatom selected from the group consisting of manganese, cobalt, nickel, copper, zinc, vanadium, niobium, and tantalum.

* * * * *